United States Patent
Yun et al.

(10) Patent No.: US 9,241,105 B2
(45) Date of Patent: Jan. 19, 2016

(54) CAMERA MODULE AND METHOD FOR DRIVING THE SAME

(75) Inventors: Sunghyun Yun, Seoul (KR); Kyongnam Park, Seoul (KR); Mihean Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 174 days.

(21) Appl. No.: 13/704,852

(22) PCT Filed: Jun. 30, 2011

(86) PCT No.: PCT/KR2011/004784
§ 371 (c)(1),
(2), (4) Date: Jan. 7, 2013

(87) PCT Pub. No.: WO2012/002742
PCT Pub. Date: Jan. 5, 2012

(65) Prior Publication Data
US 2013/0162880 A1     Jun. 27, 2013

(30) Foreign Application Priority Data

Jun. 30, 2010  (KR) .................. 10-2010-0062832
Jul. 6, 2010   (KR) .................. 10-2010-0064755
Aug. 25, 2010  (KR) .................. 10-2010-0082634
Nov. 8, 2010   (KR) .................. 10-2010-0110191

(51) Int. Cl.
*H04N 5/232* (2006.01)
*H04N 5/235* (2006.01)

(52) U.S. Cl.
CPC ........... *H04N 5/23293* (2013.01); *H04N 5/235* (2013.01); *H04N 5/2353* (2013.01); *H04N 5/23216* (2013.01)

(58) Field of Classification Search
USPC .................................................. 348/362–364
See application file for complete search history.

(56) References Cited

U.S. PATENT DOCUMENTS

| | | | |
|---|---|---|---|
| 8,531,319 B2 * | 9/2013 | Ku et al. .................. 341/20 |
| 2006/0228102 A1 * | 10/2006 | Yang et al. .................. 396/213 |
| 2009/0091650 A1 | 4/2009 | Kodama |
| 2010/0097493 A1 * | 4/2010 | Asoma .................. 348/229.1 |
| 2011/0050923 A1 * | 3/2011 | Nomura et al. ........... 348/208.99 |

FOREIGN PATENT DOCUMENTS

| JP | 6-260370 A | 10/1993 |
|---|---|---|
| JP | 8-240833 A | 9/1996 |
| JP | 2004-29879 A | 1/2004 |
| JP | 2005-347891 A | 12/2005 |
| JP | 2006-53250 A | 2/2006 |
| JP | 2006053250 | * 2/2006 |

* cited by examiner

*Primary Examiner* — Roberto Velez
*Assistant Examiner* — Yih-Sien Kao
(74) *Attorney, Agent, or Firm* — Birch, Stewart, Kolasch & Birch, LLP (57) ABSTRACT

The present invention relates to a camera module and a method for driving the camera module, the module including: a photographing unit controlling a shutter speed to photograph an image in response to an inputted control signal; a display unit displaying the image; and a controller outputting a first shutter speed control signal to the photographing unit to allow an average brightness of two or more particular areas to become a set reference brightness, in a case the two or more particular areas in a plurality of divided areas in the display unit are selected.

15 Claims, 7 Drawing Sheets

CAMERA MODULE AND METHOD FOR DRIVING THE SAME

TECHNICAL FIELD

The teachings in accordance with the exemplary embodiments of this invention relate generally to a camera module and a method for driving the camera module.

BACKGROUND ART

A camera module mounted in small-sized terminals such as digital cameras or portable phones employs an image sensor or a photoelectric conversion device such as a charge coupled apparatus (CCD) type or a complementary metal oxide semiconductor (CMOS) type to converge light from objects to a photosensitive element and to form images of the objects. The camera module is embedded with an auto exposure (AE) function to adjust brightness level of an output image based on brightness of the image by detecting the image brightness of an object.

Generally, an AE method is configured to adjust brightness of an output image based on brightness of entire image photographed by the camera module, such that there is inconvenience of adjusting the brightness by a user in order to obtain a desired level of brightness in a particular area.

DISCLOSURE OF INVENTION

Technical Problem

The present invention is directed to solve the aforementioned disadvantages or shortcomings, and is to provide a camera module capable of adjusting brightness of an image by controlling exposure based on an average brightness of two or more selected particular areas, and a method for driving the camera module.

The present invention is directed to provide a camera module capable of adjusting brightness of an image by controlling exposure based on a brightness of a selected particular area, and a method for driving the camera module.

The present invention is directed to provide a method for driving a camera module capable of adjusting brightness of a particular area desired by a user.

The present invention is directed to provide a method for driving a camera module capable of designating a focus area by a user.

Technical problems to be solved by the present invention are not restricted to the above-mentioned, and any other technical problems not mentioned so far will be clearly appreciated from the following description by skilled in the art.

Solution to Problem

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, and in one general aspect of the present invention, there is provided a camera module, the camera module comprising: a photographing unit controlling a shutter speed to photograph an image in response to an inputted control signal; a display unit displaying the image; and a controller outputting a first shutter speed control signal to the photographing unit to allow an average brightness of two or more particular areas to become a set reference brightness, in a case the two or more particular areas in a plurality of divided areas in the display unit are selected.

Preferably, the controller outputs a second shutter speed control signal to the photographing unit to allow a brightness of an entire preview image to become the reference brightness, in a case the two or more particular areas in a plurality of divided areas in the display unit are not selected.

Preferably, the controller outputs a first shutter speed control signal to the photographing unit to decrease a shutter speed of the photographing unit in response to a difference between the brightness of the particular area and the reference brightness, in a case the brightness of the particular area is lower than the reference brightness.

Preferably, the controller outputs a first shutter speed control signal to the photographing unit to increase the shutter speed of the photographing unit in response to a difference between the brightness of the particular area and the reference brightness, in a case the brightness of the particular area is higher than the reference brightness.

Preferably, the particular area includes at least more than two areas, and the controller outputs a first shutter speed control signal to the photographing unit to allow an average brightness of two or more particular areas to become a set reference brightness, in a case the two or more particular areas in a plurality of divided areas in the display unit are selected.

Preferably, the controller outputs a second shutter speed control signal to the photographing unit to allow a brightness of an entire preview image to become the reference brightness, in a case the two or more particular areas in a plurality of divided areas in the display unit are not selected.

Preferably, the controller outputs a first shutter speed control signal to the photographing unit to decrease a shutter speed of the photographing unit in response to a difference between the average brightness of the particular areas and the reference brightness, in a case an average brightness of the two or more particular areas is lower than the reference brightness.

Preferably, the controller outputs a first shutter speed control signal to the photographing unit to increase a shutter speed of the photographing unit in response to a difference between the average brightness of the particular areas and the reference brightness, in a case an average brightness of the two or more particular areas is higher than the reference brightness.

In another general aspect of the present invention, there is provided a method for driving a camera module, the method comprising: photographing a preview image (a); displaying the preview image on a display unit having a touch screen function (b); selecting a particular area from a plurality of divided areas on the display unit (c); setting up a shutter speed to allow a brightness of the particular area to become a set reference brightness (d); and photographing an image using the set shutter speed (e).

Preferably, the (d) step includes setting a shutter speed decreased in response to a difference between the brightness of the particular area and the reference brightness, in case a brightness of the particular areas is lower than the reference brightness.

Preferably, the (d) step includes setting a shutter speed increased in response to a difference between the brightness of the particular area and the reference brightness, in case a brightness of the particular areas is higher than the reference brightness.

Preferably, the (c) step includes selecting at least two or more particular areas among a plurality of divided areas on the display unit, and the (d) step includes setting a shutter speed to allow an average brightness of the two or more particular areas to become the reference brightness.

Preferably, the (d) step includes setting a shutter speed decreased in response to a difference between an average brightness of the two or more particular areas and the reference brightness, in case a brightness of the two or more particular areas is lower than the reference brightness.

Preferably, the (d) step includes setting a shutter speed increased in response to a difference between an average brightness of the two or more particular areas and the reference brightness, in case a brightness of the two or more particular areas is higher than the reference brightness.

In still another general aspect of the present invention, there is provided a method for driving a camera module, the method comprising: photographing a preview image (a); displaying the preview image on a display unit having a touch screen function (b); determining whether a particular area is selected from among a plurality of divided areas on the display unit (c); setting a shutter speed to allow a brightness of entire preview image to become a set reference brightness, in case the particular area is not selected (d); and setting the shutter speed to allow a brightness of the particular area to become the reference brightness, in case the particular area is selected (e).

Preferably, the (d) step includes setting a shutter speed decreased in response to a difference between the brightness of the particular area and the reference brightness, in case a brightness of the particular areas is lower than the reference brightness.

Preferably, the (d) step includes setting a shutter speed increased in response to a difference between the brightness of the particular area and the reference brightness, in case a brightness of the particular areas is higher than the reference brightness.

Preferably, the (c) step includes selecting at least two or more particular areas among a plurality of divided areas on the display unit, and the (d) step includes setting a shutter speed to allow an average brightness of the two or more particular areas to become the reference brightness.

Preferably, the (d) step includes setting a shutter speed decreased in response to a difference between an average brightness of the two or more particular areas and the reference brightness, in case a brightness of the two or more particular areas is lower than the reference brightness.

Preferably, the (d) step includes setting a shutter speed increased in response to a difference between an average brightness of the two or more particular areas and the reference brightness, in case a brightness of the two or more particular areas is higher than the reference brightness.

In still another general aspect of the present invention, there is provided a camera module, the camera module comprising: a photographing unit photographing an image by controlling a shutter speed in response to an inputted control signal; a display unit displaying the image; and a controller outputting a first shutter speed control signal to the photographing unit to allow a brightness of a particular area to become a set reference brightness, in a case the particular area among a plurality of divided areas in the display unit is selected.

In still another general aspect of the present invention, there is provided a method for driving a camera module, the method comprising: photographing a preview image; displaying the preview image on a display unit having a touch screen function; selecting a particular area among a plurality of divided areas on the display unit; setting up a shutter speed to allow a brightness of the particular area to be a set reference brightness; and photographing an image using the set shutter speed.

In still another general aspect of the present invention, there is provided a method for driving a camera module, the method comprising: photographing a preview image; displaying the preview image on a display unit having a touch screen function; determining whether a particular area is selected from among a plurality of divided areas on the display unit; setting a shutter speed to allow a brightness of entire preview image to become a set reference brightness, in case the particular area is not selected; and setting the shutter speed to allow a brightness of the particular area to become the reference brightness, in case the particular area is selected.

In still another general aspect of the present invention, there is provided a method for driving a camera module, the method comprising: photographing a preview image (a); displaying the preview image on a display unit having a touch screen function (b); setting as a reference area an initially selected area among a plurality of divided areas on the display unit (c); setting as a particular area a secondarily selected area among the plurality of divided areas on the display unit (d); comparing a brightness of the reference area with a brightness of the particular area, and generating an initially corrected image for increasing or decreasing as much as the reference brightness set up by the particular area in the preview image, as a result of the comparison (e); and displaying the initially corrected image on the display unit (f).

In still another general aspect of the present invention, there is provided a method for driving a camera module, the method comprising: obtaining an image; selecting a focus area user input mode; recognizing a finger area; setting a focus area based on a distal point of the finger area; and executing an autofocus to an object inside the focus area.

In still another general aspect of the present invention, there is provided a method for driving a camera module, the method comprising: obtaining an image; selecting a focus area user input mode; recognizing a two-finger area; setting a focus area using a line connecting two distal points of the two-finger area; and executing an autofocus to an object inside the focus area.

Advantageous Effects of Invention

The camera module and a method for driving the camera module according to the present invention have advantageous effects in that a shutter speed of the camera module is adjusted to allow an average brightness of two or more selected particular areas in a preview image to be equal, whereby an image of various types of brightness can be photographed based on the brightness of the selected two or more particular areas.

Furthermore, the camera module and a method for driving the camera module according to the present invention have advantageous effects in that a shutter speed of the camera module is adjusted to allow a brightness of a selected particular area in a preview image to be equal, whereby an image of various types of brightness can be photographed based on the brightness of the particular area.

Furthermore, the camera module and a method for driving the camera module according to the present invention have advantageous effects in that a corrected image increasing or decreasing a brightness of a particular area in proportion to counts in which the particular area is selected, and the corrected image is outputted to a display unit, whereby a user can visually check the image (a preview image, a corrected image) through the display unit to adjust the particular area in a desired brightness.

Furthermore, the camera module and a method for driving the camera module according to the present invention have advantageous effects in that a focal area desired by a user can be forthrightly set to photograph images of various focuses by setting up the focal area based on a distal point of a finger area through recognition of the finger area.

Furthermore, the camera module and a method for driving the camera module according to the present invention have advantageous effects in that a distance between two finger areas can be adjusted to allow a user to adjust a size of focal area desired by a user.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-17 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Words such as "thereafter," "then," "next," etc. are not intended to limit the order of the processes; these words are simply used to guide the reader through the description of the methods. The terms "first," "second," and the like, herein do not denote any order, quantity, or importance, but rather are used to distinguish one element from another, and the terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Figure 1:
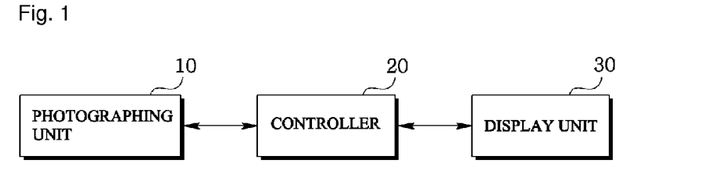
FIG. 1 is a schematic block diagram of a camera module according to first and second exemplary embodiments of the present invention.
Figure 2:
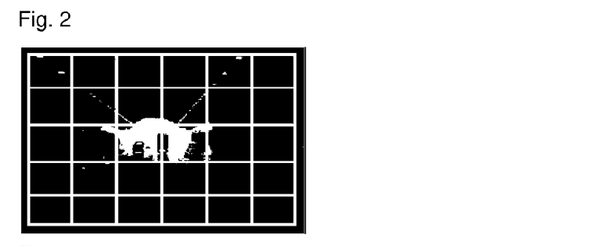
FIG. 2 is an exemplary view of a display unit according to first and second exemplary embodiments of the present invention.
Figure 3:
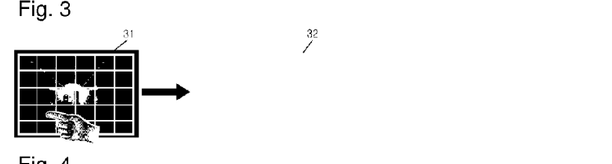
FIGS. 3 and 4 are exemplary views of an image based on a brightness of a selected particular area.
Figure 4:
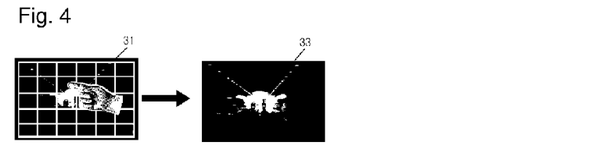

FIG. 1 is a schematic block diagram of a camera module according to first and second exemplary embodiments of the present invention, FIG. 2 is an exemplary view of a display unit according to the first and second exemplary embodiments of the present invention, FIGS. 3a and 3b are exemplary views of an image based on a brightness of a selected particular area, and FIG. 4 is an exemplary view of an image based on an average brightness of two or more particular areas according to an exemplary embodiment of the present invention.

Referring to FIG. 1, a camera module includes a photographing unit (10), a controller (20) and a display unit (30).

The photographing unit (10) changes exposure time using a shutter speed inputted from the controller (20) to photograph an object. The controller (20) changes the image photographed in real time by the photographing unit (10) to an image adequate to the display unit (30) and outputs the image to the display unit (30). The display unit (30) is means or a touch screen for displaying the image inputted from the controller (20).

Referring to FIG. 2, the display unit (30) according to the present invention is displayed with a preview image, and the preview image may be divided into a plurality of areas, where a user touches the touch screen to select at least two or more particular areas among the plurality of areas on the display unit (30).

The controller (20) under "exposure area automatic set mode" outputs the preview image photographed by the photographing unit (10) to the display unit (30), and controls the shutter speed of the photographing unit (10) to allow an entire brightness (Y, luminance, hereinafter the terms of brightness and luminance may be interchangeably used) of the preview image to become a set reference luminance. Then, the photographing unit (10) operates at a shutter speed inputted from the controller (20) to photograph an object.

The controller (20) under "exposure area automatic set mode" outputs the preview image photographed by the photographing unit (10) to the display unit (30), and controls the shutter speed of the photographing unit (10) to allow an average luminance of two or more particular areas selected from the preview image to become a set reference luminance. Then, the photographing unit (10) operates at a shutter speed inputted from the controller (20) to photograph an image.

As noted above, a user selects at least two or more display areas among the plurality of areas on the display unit (30), the reason of which will be explained with reference to FIGS. 3a and 3b.

Referring to FIG. 3, in case a user selects an area darker than other areas in the preview image (31) as a particular area, luminance of two relatively darker particular areas becomes a base for entire luminance, where the display unit (30) is displayed with an image (32) excessively brighter than the preview image (31).

Referring to FIG. 4, in case a user selects an area brighter than other areas in the preview image (31) as a particular area, luminance of a relatively brighter area becomes a base for entire luminance, where the display unit (30) is displayed with an image (33) darker than the preview image (31).

As noted above, in case a user selects a particular area, and luminance of the particular area becomes a base for entire luminance to control exposure of an image, an outputted image may be excessively bright, or may lose a correction effect resultant from exposure control.

Figure 5:
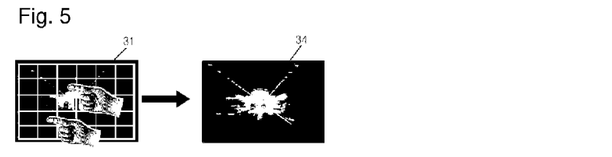
FIG. 5 is an exemplary view of an image based on an average brightness of two or more particular areas according to the first exemplary embodiment of the present invention.

Therefore, as shown in FIG. 5, at least two or more particular areas among the plurality of areas on the display unit (30) are selected in the present invention, and a shutter speed control signal is outputted to the photographing unit (10) to allow an average luminance of the two or more particular areas to become a set reference luminance. Thus, the average luminance of two or more particular areas becomes a base for the entire luminance, such that the display unit (30) is displayed with an image (34) having an adequate luminance over that of the preview image (31).

To be more specific, in case the average luminance of two or more particular areas is brighter than the set reference luminance, the controller (20) outputs to the photographing unit (10) a control signal instructing to increase a shutter speed at a size corresponding to a difference between the average luminance of two or more particular areas and the reference luminance.

Then, the photographing unit (10) photographs an image at a shutter speed increased by as much as the shutter speed corresponding to the inputted control signal, and outputs to the controller (20) an image reduced in exposure time of the image. Thereafter, the controller (20) to the display unit (30) an overall dark image reduced in exposure time.

Furthermore, in case the average luminance of two or more particular areas is darker than the set reference luminance, the controller (20) outputs to the photographing unit (10) a control signal instructing to decrease a shutter speed at a size corresponding to a difference between the average luminance of two or more particular areas and the reference luminance.

Then, the photographing unit (10) photographs an image at a shutter speed decreased by as much as the shutter speed corresponding to the inputted control signal, and outputs to the controller (20) an image increased in exposure time of the image. Thereafter, the controller (20) to the display unit (30) an overall dark image increased in exposure time.

In the present invention as noted above, in case a user selects at least two or more particular areas among the divided plurality of areas on the display unit (30) in the present invention, while the display unit (30) having a touch screen function is displayed with a preview image, the shutter speed of the photographing unit (10) is so controlled as to allow an average luminance of two or more particular areas to become the set reference luminance, whereby an image having a desired exposure time can be obtained.

Figure 6:
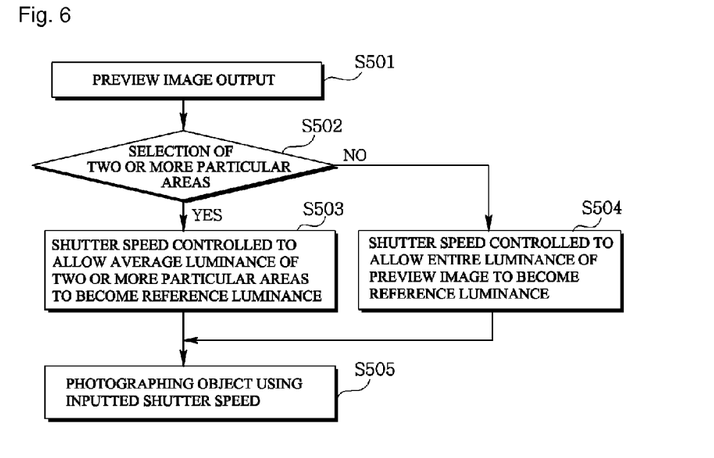
FIG. 6 is a schematic block diagram illustrating a method for driving a camera module according to a first exemplary embodiment of the present invention.

FIG. 6 is a schematic block diagram illustrating a method for driving a camera module according to a first exemplary embodiment of the present invention.

The controller (20) outputs a preview image captured by the photographing unit (10) to the display unit (30) (S501). In case at least one or more particular areas among the divided plurality of areas on the display unit (30) is selected, the controller (20) outputs a signal controlling a shutter speed of the photographing unit (10) to allow an average luminance of the one or more particular areas to become the set reference luminance (S503).

At this time, in case two or more particular areas among the divided plurality of areas on the display unit (10) are not selected (S502), the controller (20) outputs a signal controlling a shutter speed of the photographing unit (10) to allow a luminance of an entire preview image to become the set reference luminance (S504). Then, the photographing unit (10) photographs an object at a shutter speed inputted from the controller (20) (S505).

As noted from the above description, a shutter speed of a camera module according to the present invention is adjusted to allow an average luminance of two or more particular areas selected from the preview image to be equal to the set reference luminance, whereby images of various brightness can be photographed in response to the brightness of the selected two or more particular areas.

Figure 7:
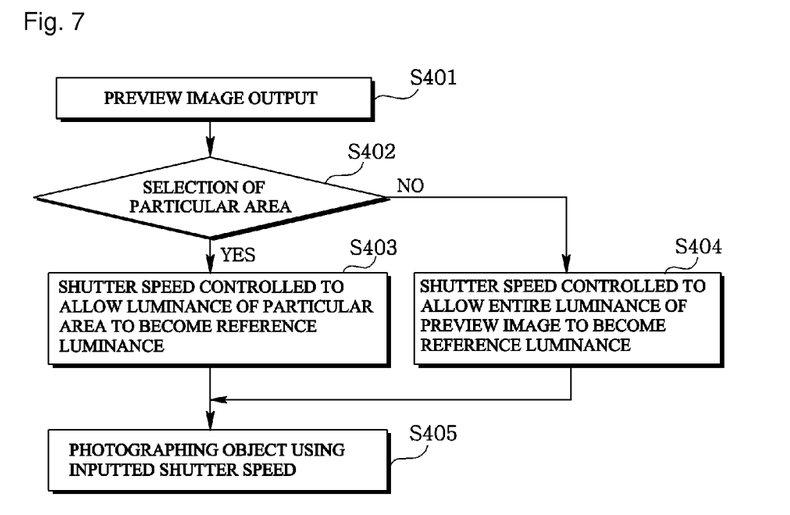
FIG. 7 is a schematic block diagram illustrating a method for driving a camera module according to a second exemplary embodiment of the present invention.

FIG. 7 is a schematic block diagram illustrating a method for driving a camera module according to a second exemplary embodiment of the present invention.

The controller (20) outputs a preview image captured by the photographing unit (10) to the display unit (30) (S401). In case a particular area among the divided plurality of areas on the display unit (30) is selected, the controller (20) outputs a signal controlling a shutter speed of the photographing unit (10) to allow a luminance of entire preview image to become the set reference luminance (S403). Then, the photographing unit (10) photographs an object at a shutter speed inputted from the controller (20) (S405).

As noted from the above description, a shutter speed of a camera module according to the present invention is adjusted to allow a luminance of a particular area selected from the preview image to be equal to the set reference luminance, whereby images of various brightness can be photographed in response to the brightness of the selected particular area.

Figure 8:
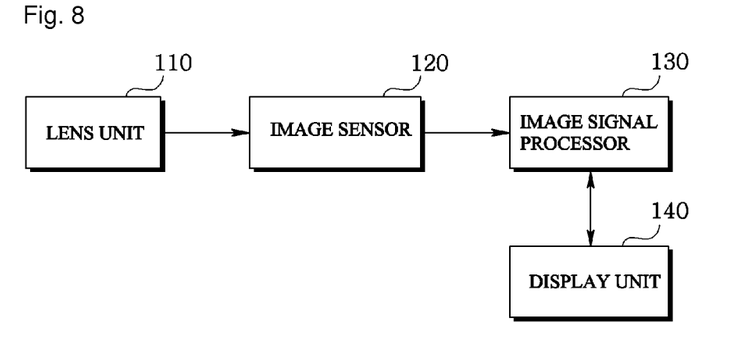
FIG. 8 is a schematic block diagram of a camera module according to a third exemplary embodiment of the present invention.
Figure 9:
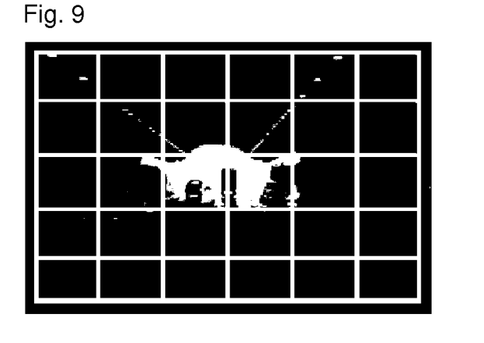
FIG. 9 is an exemplary view of a display unit according to a third exemplary embodiment of the present invention.
Figure 10:
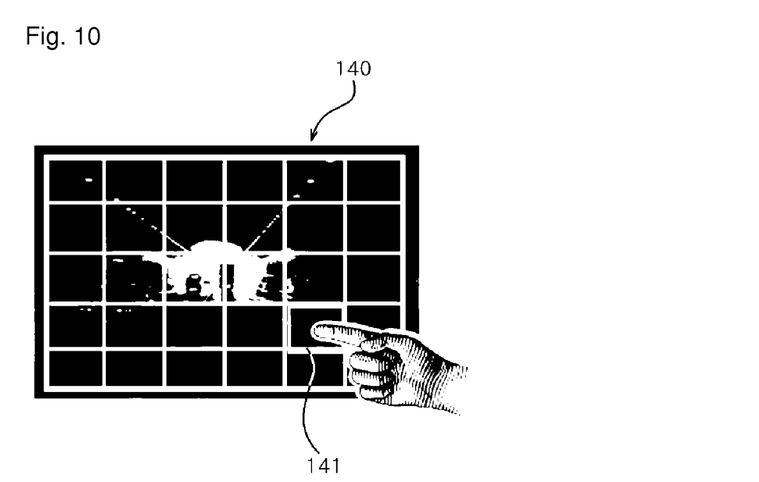
FIGS. 10 and 11 are schematic views illustrating a process of selecting a selection area and a particular area according to a third exemplary embodiment of the present invention.

FIG. 8 is a schematic block diagram of a camera module according to a third exemplary embodiment of the present invention, FIG. 9 is an exemplary view of a display unit according to a third exemplary embodiment of the present invention, and FIGS. 10a and 10b are schematic views illustrating a process of selecting a selection area and a particular area according to a third exemplary embodiment of the present invention.

Referring to FIG. 8, a camera module includes a lens unit (110), an image sensor (120), an image signal processor (130) and a display unit (140).

The lens unit (110) includes at least one or more lenses, receives an optical energy, concentrates the incident optical energy and outputs the optical energy to the image sensor (120). The image sensor (120) includes a plurality of pixels detecting the optical energy having passed the lens unit (110), converts the optical energy detected by the plurality of pixels to an electric signal and outputs the electric signal to the image signal processor (130).

The image signal processor (130) converts the image inputted from the image sensor (120) to a preview image adequate to the display unit (140) and outputs the preview image to the display unit (140). The display unit (140), which is a means for displaying images (preview image, correction image, etc.) inputted from the image signal processor (130), is a touch screen. As shown in FIG. 9, the display unit (140) according to the present invention is displayed with the preview image, and the preview image may be divided into a plurality of areas.

Figure 11:
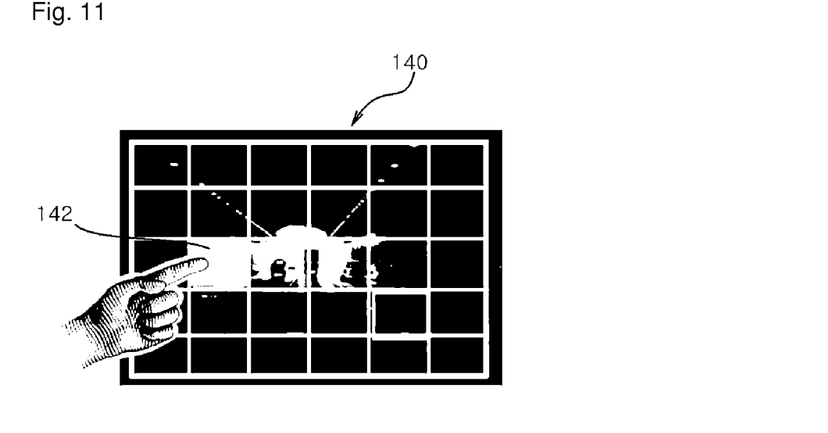

Referring to FIGS. 10 and 11, a user touches the touch screen to initially select a reference area (141) among the plurality of areas on the display unit (140), and secondarily select a particular area.

At this time, the user may touch the particular area at least one time, and whenever the particular area is touched, a "touch signal" is inputted to the image signal processor (130). Then, the image signal processor (130) generates a correction image in which luminance of a particular area (142) is increased or decreased as much as touch counts, and outputs the correction image to the display unit (140).

To be more specific, the image signal processor (130) sets up as the reference area (141) the area initially selected from the display unit (140) divided into the plurality of areas, and sets up the secondarily selected area as the particular area (142). Furthermore, the image signal processor (130) compares the luminance of the reference area (141) with that of the particular area (142), and if the luminance of the reference area (141) is higher than that of the particular area (142), the image signal processor (130) increases the luminance of the particular area (142) as much as the set reference luminance, and outputs to the display unit (140) the initially corrected image in which luminance of the particular area (142) is increased as much as the reference luminance.

Alternatively, the image signal processor (130) compares the luminance of the reference area (141) with that of the particular area (142), and if the luminance of the reference area (141) is lower than that of the particular area (142), the image signal processor (130) decreases the luminance of the particular area (142) as much as the set reference luminance, and outputs to the display unit (140) the initially corrected image in which luminance of the particular area (142) is decreased as much as the reference luminance.

The reference luminance in the present invention may be a fixed value set up by the image signal processor (130), and may be a difference value between the luminance of the reference area (141) and that of the particular area (142).

The following description describes a case where the luminance of the reference area (141) is higher than that of the particular area (142) for the convenience of explanation.

The initially corrected image is a case where the particular area (142) is selected once, and the particular area may be consecutively selected more than at least once.

Therefore, in case the particular area is selected twice and a touch signal is inputted from the display unit (140), the image signal processor (130) generates a secondarily corrected image in which the luminance of the particular area (142) is increased as much as the reference luminance in the initially corrected image, and outputs the secondarily corrected image to the display unit (140).

In case the particular area (142) in the secondarily corrected image is selected again, and a touch signal is inputted from the display unit (140) (in case the particular area is selected thrice), the image signal processor (130) generates a thirdly corrected image in which the luminance of the particular area (142) is increased as much as the reference luminance in the secondarily corrected image, and outputs the thirdly corrected image to the display unit (140).

As noted from the foregoing, the image signal processor (130) according to the present invention generates a corrected image in which luminance of a particular area is increased or decreased in proportion to the counts of the particular area being selected, and outputs the corrected image to the display unit (140), whereby a user can visually check the images (preview images, corrected images, etc.) through the display unit (140) to adjust the brightness of the particular area to a desired brightness.

MODE FOR THE INVENTION

Figure 12:
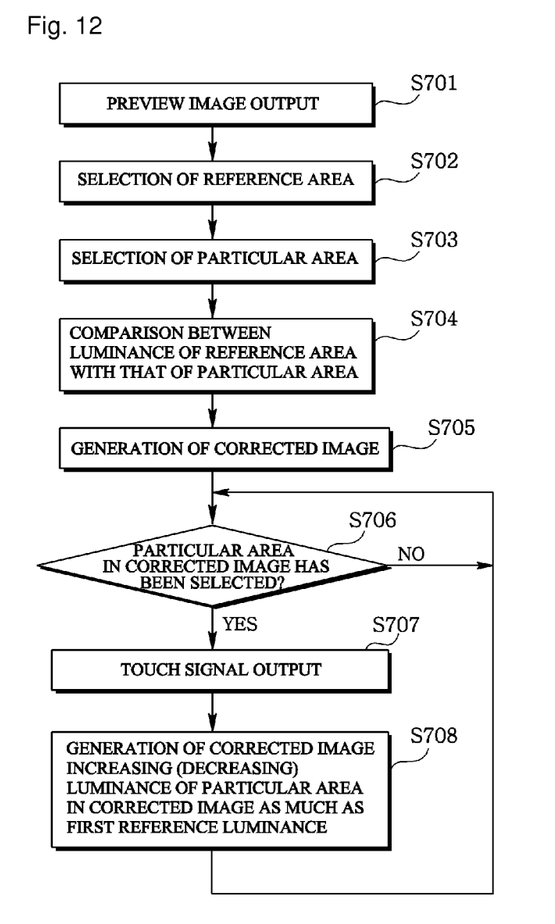
FIG. 12 is a schematic block diagram illustrating a method for driving a camera module according to a third exemplary embodiment of the present invention.

FIG. 12 is a schematic block diagram illustrating a method for driving a camera module according to a third exemplary embodiment of the present invention.

As illustrated in FIG. 12, the image signal processor generates the image inputted from the image sensor as a preview image, and outputs the image to the display unit (S701). The image signal processor sets up an area initially selected from the plurality of divided areas on the display unit (S702), and sets up the secondarily selected area as a particular area (S703).

Successively, the image signal processor compares the luminance of reference area and that of the particular area (S704). The image signal processor generates an initially corrected image for increasing the luminance of particular area, in case the luminance of the reference area is higher than that of the particular area, and the image signal processor generates an initially corrected image for decreasing the luminance of particular area, in case the luminance of the reference area is lower than that of the particular area (S705).

To be more specific, the image signal processor generates an initially corrected image in which luminance of particular area is increased as much as the reference luminance in the preview image, in case the luminance of reference area is higher than that of the particular area, and outputs the initially corrected image to the display unit.

Alternatively, in case the luminance of the reference area is lower than that of the particular area, the image signal processor generates an initially corrected image in which luminance of particular area is decreased as much as the reference luminance in the preview image, and outputs the initially corrected image to the display unit.

The display unit detects whether a particular area is selected from a currently corrected image (initially corrected image) currently displayed on the display unit (S706), and outputs a touch signal to the image signal processor (S707) in case the particular area is selected.

The image signal processor inputted by the touch signal generates a corrected image (secondarily corrected signal) in which luminance of the particular area among the currently corrected image (initially corrected image) is increased (decreased) as much as the reference luminance, and the corrected image (secondarily corrected image)is displayed on the display unit as the currently corrected image (S708).

Next, the steps S706-S708 are repeated to allow the corrected image to be outputted to the display unit, the corrected image being that luminance of the particular area is increased or decreased in proportion to the counts of selecting the particular area by the user, whereby the user can visually check the currently corrected image through the display unit and to adjust the luminance of particular area to a desired luminance.

Figure 13:
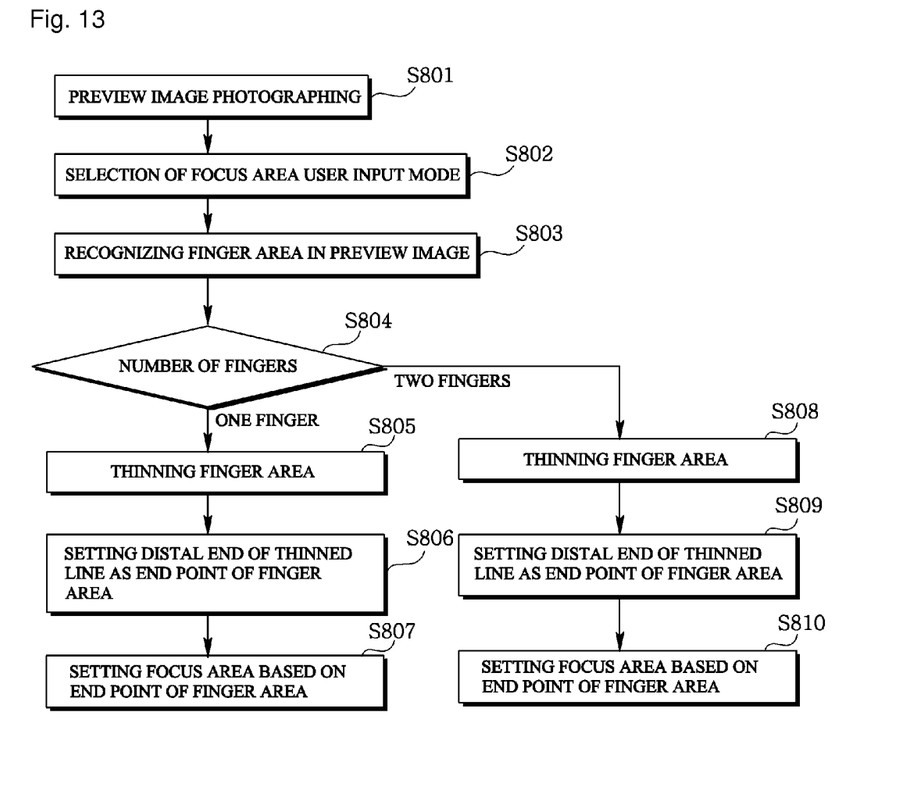
FIG. 13 is a schematic block diagram illustrating an operation of a display unit according to a fourth exemplary embodiment of the present invention.
Figure 14:
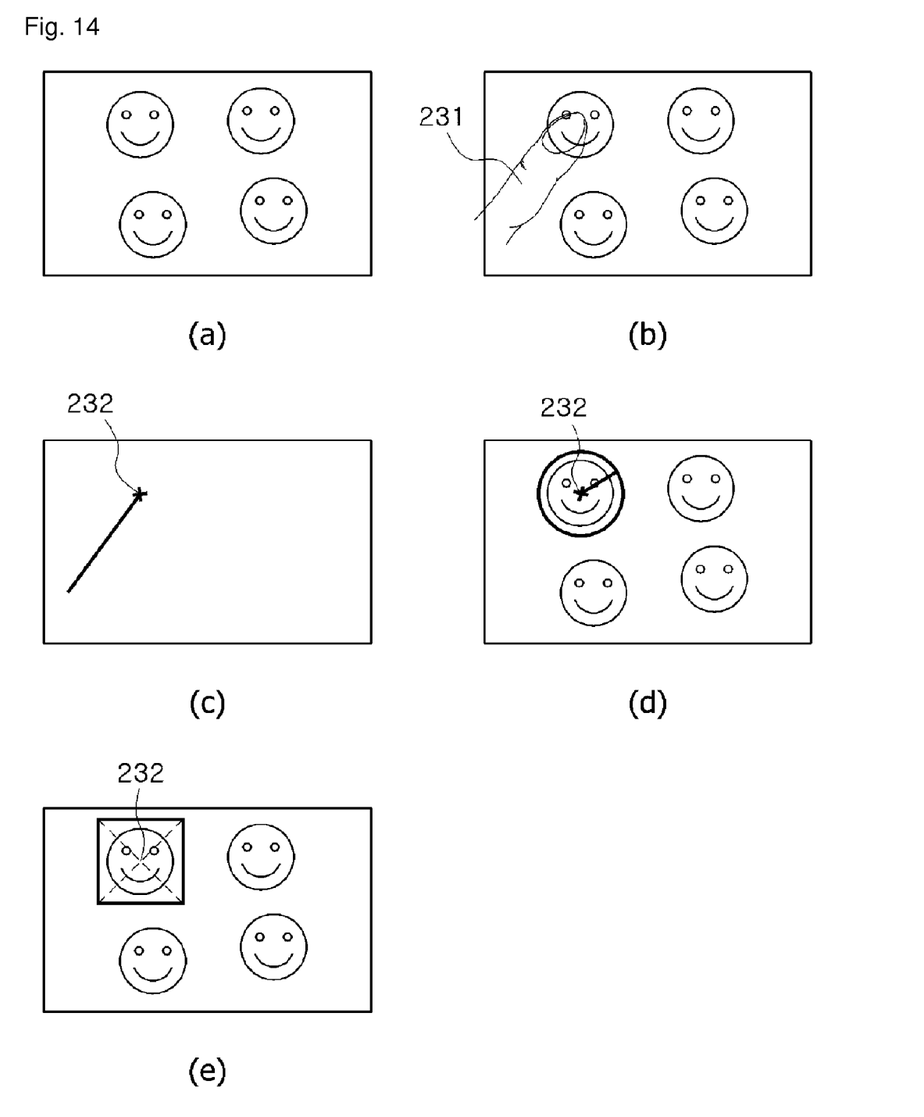
FIG. 14 is an exemplary view of an image displayed on a display unit according to an operation of a display unit, in case there is one finger area.
Figure 15:
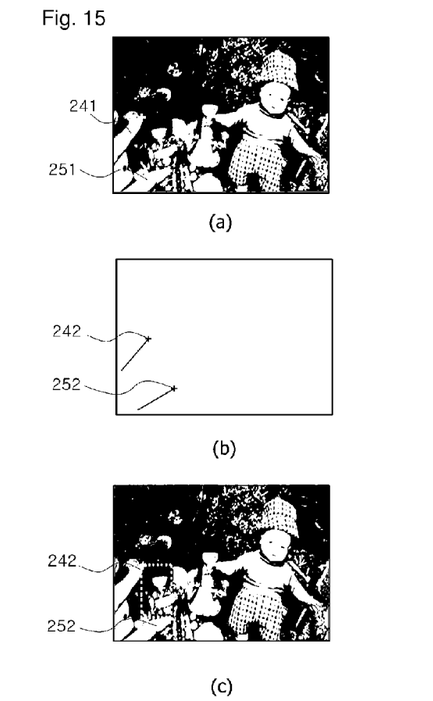
FIG. 15 is an exemplary view of an image displayed on a display unit according to an operation of a display unit, in case there are two finger areas.

FIG. 13 is a schematic block diagram illustrating an operation of a display unit according to a fourth exemplary embodiment of the present invention, FIG. 14 is an exemplary view of an image displayed on a display unit according to an operation of a display unit, in case there is one finger area, and FIG. 15 is an exemplary view of an image displayed on a display unit according to an operation of a display unit, in case there are two finger areas.

A camera module applied with the fourth exemplary embodiment of the present invention includes the configuration of FIG. 1.

In case an object is photographed by a photographing unit as illustrated in FIG. 13 (S801), the display unit displays a preview image as shown in FIG. 14a. In case "focus area user input mode" is selected (S802), the controller recognizes a finger area (31) in the preview image as illustrated in FIG. 14b (S803).

Figure 16:
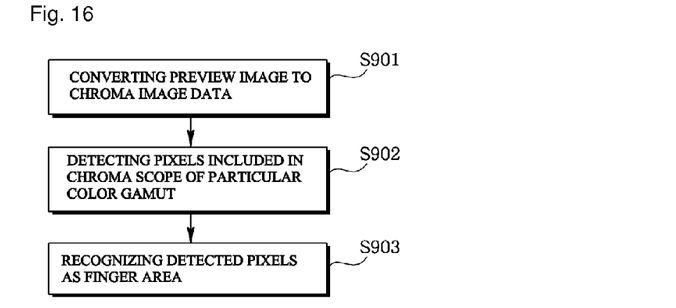
FIG. 16 is a schematic block diagram illustrating a process of recognizing a finger area by a controller according to a fourth exemplary embodiment of the present invention.

FIG. 16 is a schematic block diagram illustrating a process of recognizing a finger area by a controller according to a fourth exemplary embodiment of the present invention.

Referring to FIG. 16, the controller converts a preview image photographed by the photographing unit to a chroma image data included with an chroma signal (S901). The chroma image data defines Cb and Cr which are color components in the YCbCr signal. Although the present invention has described the image as preview image converted to chroma image data, it is not limited thereto. For example, the image can be converted to RGB image data, and the RGB image data can be converted to the chroma image data.

Pixels included in a chroma scope of a particular color gamut designated in chroma image data of each of a plurality of pixels are detected (S902). At this time, the particular color gamut is a particular chroma scope or a particular luminance scope among images on which an object is displayed on the display unit, and may include various color gamut covering skin color, hair color, red color, green color and blue color.

However, the skin color is set up as a particular color gamut in order to calculate a finger area. The following description exemplifies the skin color as the particular color gamut for the convenience of explanation.

Figure 17:
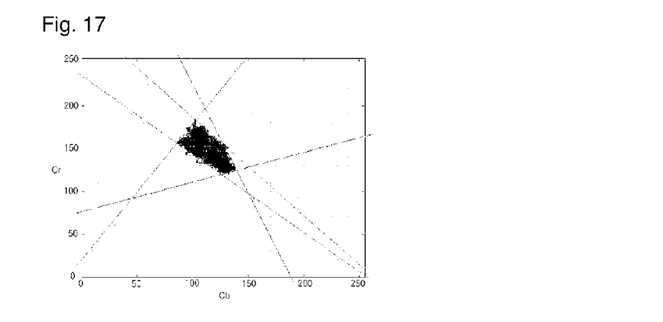
FIG. 17 is a graph in which skin color distribution is modeled in bivariate normal distribution.

FIG. 17 is a graph in which skin color distribution is modeled in bivariate normal distribution, where the X axis is a Cb chrominance signal value, while the Y axis represents Cr chrominance signal value. The skin color gamut of FIG. 17 is a color gamut extracted by statistically investigating skin colors of Korean people, and therefore, the skin color gamut may be differently extracted based on country, race and the like.

The controller extracts as a finger area the pixels included in chroma scope of particular color gamut among chroma image data of each of the plurality of pixels (S903). At this time, the controller may extract the pixels as a plurality of finger areas in consideration of edges.

Subsequent to S803 in FIG. 13, in case the number of fingers in a finger area (231) is one (S804), the controller may thin the finger area as shown in FIG. 14c (S805), and detect a distal end of thinned line as an end point (232) of the finger area (231) (S806). The controller sets up a focus area based on the end point (232) of the finger area (231) (S807).

Referring to FIG. 14d, the focus area may be a circular area where radius is r with the end point (232) as a pivot point. Furthermore, the focus area may be a square area with the end point (232) as a pivot point as shown in FIG. 14e.

In case the number of recognized finger areas is two (S804), the controller thins the recognized finger areas (242, 251) as illustrated in FIG. 15b (S808), and the distal end of the thinned lines is detected as end points (242, 252) of finger areas (241, 251) (S809). The controller determines the focus area based on the end points (242, 252) of the finger areas (242, 251) (S810).

Referring to FIG. 15c, the focus area may be a square area using a line connecting the end points (242, 252) as a diagonal line. The focus area may be a circular area (not shown) using the line connecting the end points (242, 252) as a diameter.

As apparent from the foregoing, the finger area is recognized to set up a focus area based on end points of finger area, whereby a user desired focus area can be forthrightly set up to photograph an image having various focuses. Furthermore, a distance between two fingers is adjusted to adjust, by a user, a size of the focus area.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The present invention has an industrial applicability in that a camera module can be implemented in which an image of various brightness can be photographed, a particular area can be adjusted to a desired brightness, an image with various focuses can be photographed and a size of the focus area can be adjusted.

The invention claimed is:

1. A method for controlling a camera module, the method comprising:
   displaying a preview image obtained by the camera module on a display;
   receiving at least first and second touch inputs on the preview image on the display;
   determining an average luminance of a first luminance at a first area receiving the first touch input and a second luminance at a second area receiving the second touch input; and
   obtaining an image having the average luminance by the camera module.

2. The method of claim 1, further comprising:
   determining a shutter speed for the image based on the average luminance, wherein the image is obtained by the shutter speed.

3. The method of claim 1, wherein the image is brighter than the preview image when the average luminance is smaller than a reference luminance.

4. The method of claim 1, wherein the image is darker than the preview image when the average luminance is greater than a reference luminance.

5. An apparatus for controlling a camera module, the apparatus comprising:
   a photographing unit configured to obtain a preview image;
   a display configured to display the preview image; and
   a controller configured to:
      receive at least first and second touch inputs on the preview image on the display,
      determine an average luminance of a first luminance at a first area receiving the first touch input and a second luminance at a second area receiving the second touch input, and
      control the photographing unit to obtain an image having the average luminance.

6. The apparatus of claim 5, wherein the controller is further configured to:
   determine a shutter speed for the image based on the average luminance, wherein the image is obtained by the shutter speed.

7. The apparatus of claim 5, wherein the image is brighter than the preview image when the average luminance is smaller than a reference luminance.

8. The apparatus of claim 5, wherein the image is darker than the preview image when the average luminance is greater than a reference luminance.

9. A method for controlling a camera module, the method comprising:
   displaying a first preview image obtained by the camera module on a display;
   receiving a first touch input on the first preview image on the display;
   receiving a second touch input on the first preview image on the display;
   comparing a first luminance at a first area receiving the first touch input with a second luminance at a second area receiving the second touch input;
   changing the second luminance to a third luminance based on a reference luminance, wherein the reference luminance is a luminance of the first area; and
   obtaining a first image having the third luminance at the second area.

10. The method of claim 9, wherein the first preview image is divided into a plurality of areas and each of the first and second areas corresponds to one of the plurality of areas.

11. The method of claim 9, wherein the changing the second luminance to the third luminance includes increasing the second luminance by the reference luminance.

12. The method of claim 9, wherein the changing the second luminance to the third luminance includes decreasing the second luminance by the reference luminance.

13. The method of claim 9, further comprising:
   displaying a second preview image on the display, the second preview image having the third luminance at the second area;
   receiving a third touch input by the touch object on the second area on the second preview image on the display;
   changing the third luminance to a fourth luminance based on the reference luminance; and
   obtaining a second image having the fourth luminance at the second area.

14. The method of claim 13, wherein the changing the third luminance to the fourth luminance includes increasing the third luminance by the reference luminance.

15. The method of claim 13, wherein the changing the third luminance to the fourth luminance includes decreasing the third luminance by the reference luminance.

* * * * *